Feb. 24, 1942.　　P. E. CHAPMAN, JR　　2,274,128
WIRE DEREELING
Filed Oct. 1, 1938

INVENTOR
P. Embree Chapman Jr.

UNITED STATES PATENT OFFICE 2,274,128

WIRE DEREELING

Penrose Embree Chapman, Jr., St. Louis, Mo.

Application October 1, 1938, Serial No. 232,716

5 Claims. (Cl. 242—128)

The object of my invention is to make it possible to take wire off over the head, or flange, of spools where it is now impossible, or at least impracticable, to do so and to do this with means that are intensely simple, cheap, and easy to use.

The term "spool" is herein used to include spools, reels, bobbins, rolls, copts, helixes, and any other wound up package.

The term "wire" is herein used to include any elongated material, as cordage, wire, ribbon, et cetera, made of any material.

In the drawing

Figure 1:
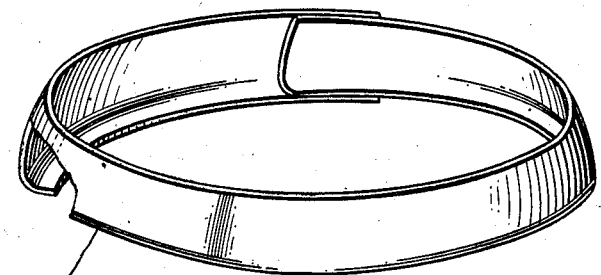
Fig. 1 is a perspective of my invention partly in section.
Figure 2:
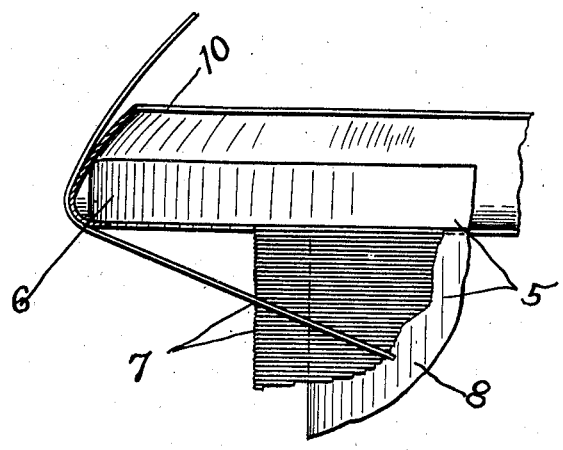
Fig. 2 shows my invention applied to the head of a spool.

Briefly, my invention consists of temporarily placing around the head, or flange 6, of a spool 5 of wire 7 a removable toroidally shaped tire 10, hereinafter called spool head tire, or a spool tire, that carries a smooth flowing exterior preferably combined with a suitable finish, as a high polish, that will permit wire to readily pass over it.

When the edge of a spool head 6 is of appropriate shape and smooth, or better still polished, wire will come off over the head, or flange, of the spool quite readily down to a certain point. Many spools do not have properly shaped nor properly finished head edges, and even if they did, wear and tear would soon spoil the finish. With such spools over the head despooling is difficult and fraught with mishaps. To mitigate these difficulties and mishaps I place over the spool flange or head 6 a tire 10 that carries an appropriate shape and finish.

When the head 6 of a spool 5 is large in proportion to the diameter of the body 8 at times the wire 7 will lock up on the flange 6 and refuse to come off no matter how well formed or smooth it is. It is therefore highly desirable that the diameter of the head 6 over the spool tire 10 be as small as possible. I accomplish this end by making the said tire 10 of thin material forming it up radially hollowed out or upwardly on the inside so that it may slip over and envelop the edge of the spool head 6 and project thereover a minimum amount.

This radially hollowing out should not be confused with the axially hollowing out of a cap or cup, for my invention is not a cap or cup, but a tire. It does not cover the whole spool head, only its edges.

I use the word "envelope" to mean not only the covering of the edge of the spool head, as if it were slipped in a tube, but also to, as it were, fold over the sides of the head enough to thoroughly cover or envelop the edges of the spool head.

In order to put said tire over a spool head it may be made jointed, but such joints are objectionable. I eliminate these objectionable joints in the said tire by making it as a snap ring, that is, making it thin and springy enough to snap over a spool head and long enough that one end laps over the other. The wire will readily slip over such a lap in one direction. The lap being reversed for the opposite direction.

Having now described my invention I wish to claim:

1. A device for temporary application to a disc-like head of a spool or the like during an unreeling operation to facilitate the withdrawal of a strand from the spool, said device comprising an annulus of relatively hard material having an outer surface engageable by the strand as it is withdrawn from the spool which surface is smoothly finished to facilitate the sliding of the strand thereover, said annulus having an inner diameter normally slightly less than the diameter of the spool head and the said material of the annulus being resilient, whereby it may be readily expanded to snap upon and embrace the periphery of the spool head and be retained thereon solely by its resilience during an unreeling operation, regardless of the position of the spool, and may be readily removed from said head at the conclusion of such operation, to thereby avoid injury to said smooth strand-engaging surface resulting from handling of the spool at other times.

2. A device for facilitating the unreeling of a strand from a spool or the like having an enlarged disc-like head, said device comprising a radially split annulus of resilient material to be readily removably snapped over the peripheral portions of the spool head to envelop said portions, said annulus being of thin concavo-convex cross section with its inner concave surface engaging the head and its outer convex surface smoothly finished to facilitate the sliding of the strand thereover.

3. A device for facilitating the unreeling of a strand from a spool or the like having a disc-like head, said device comprising an annulus of resilient material, radially severed at one point on its circumference whereby it may be readily removably snapped over the peripheral portions of the spool head, with its ends in overlapping relationship, said annulus having a smooth exterior strand-engaging surface.

4. A device for facilitating the unreeling of a strand from a spool or the like having an enlarged disc-like head, said device comprising a radially split annulus of resilient material circumferentially expansible and contractible whereby it may be readily removably snapped over and shield the peripheral portions of the spool head, with its ends alternatively overlapping in one direction or the other depending upon the direction in which the strand will unwind from the spool.

5. A despooling device, consisting of a removable snap ring type spool head tire whose inner surface is radially hollowed out to slip over and envelope the edges of a spool head, the outer surface of said tire being smoothly shaped and finished to permit wire to readily pass over it, and whose ends overlap.

PENROSE EMBREE CHAPMAN, Jr.